March 16, 1943.  H. A. REECE  2,313,769
APPARATUS AND METHOD FOR THE CONTROL
OF AIR FLOW THROUGH FURNACE TUYERES
Filed Dec. 17, 1941  3 Sheets-Sheet 1
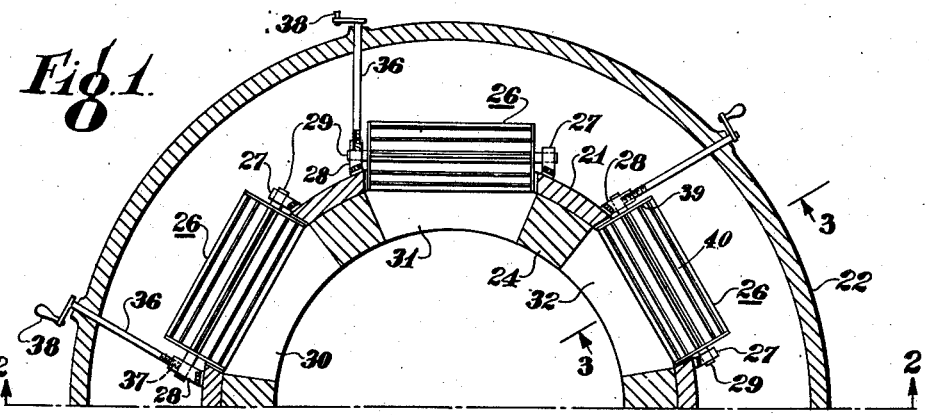
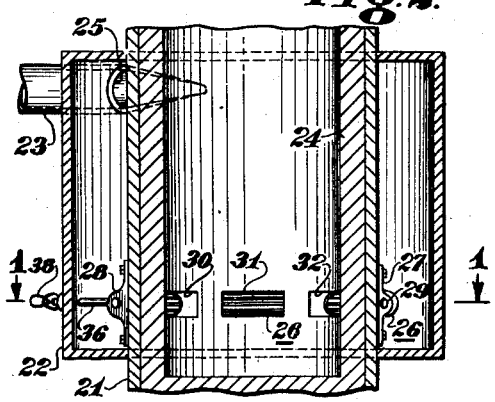
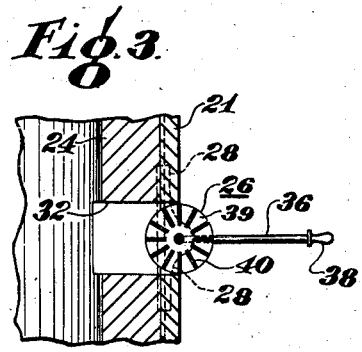
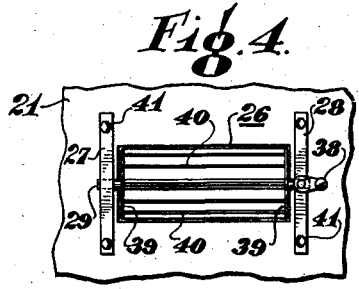
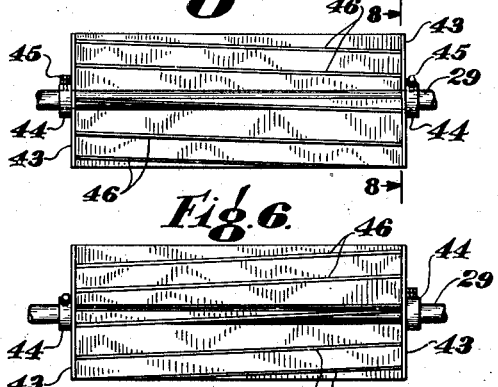
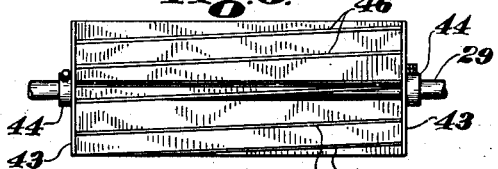
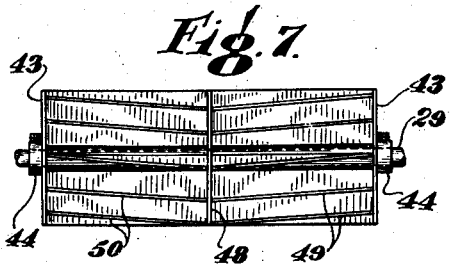
INVENTOR.
*HERBERT A. REECE.*
BY
ATTORNEYS.

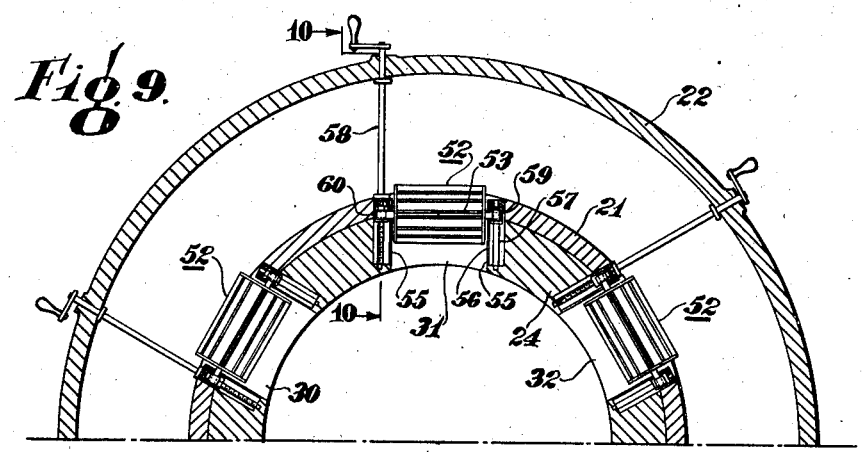
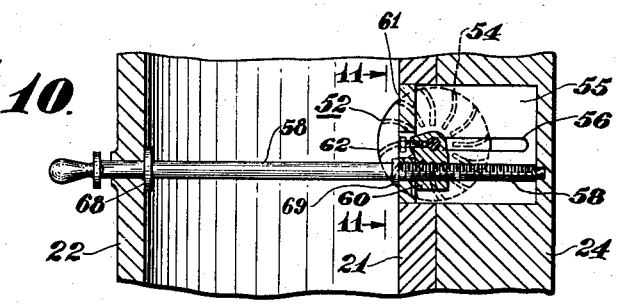
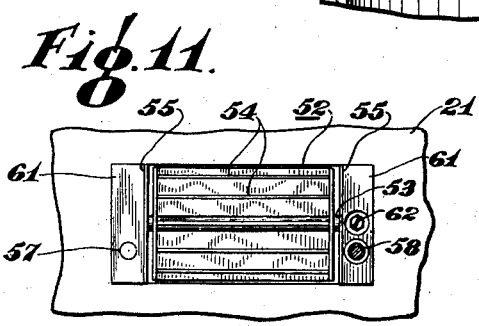
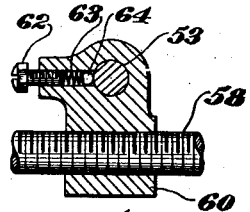
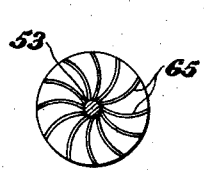
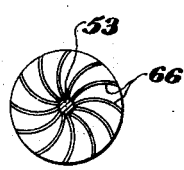

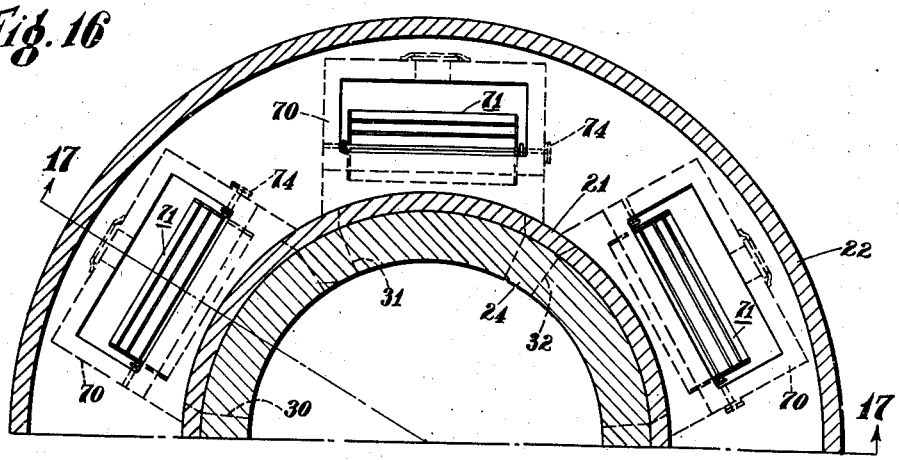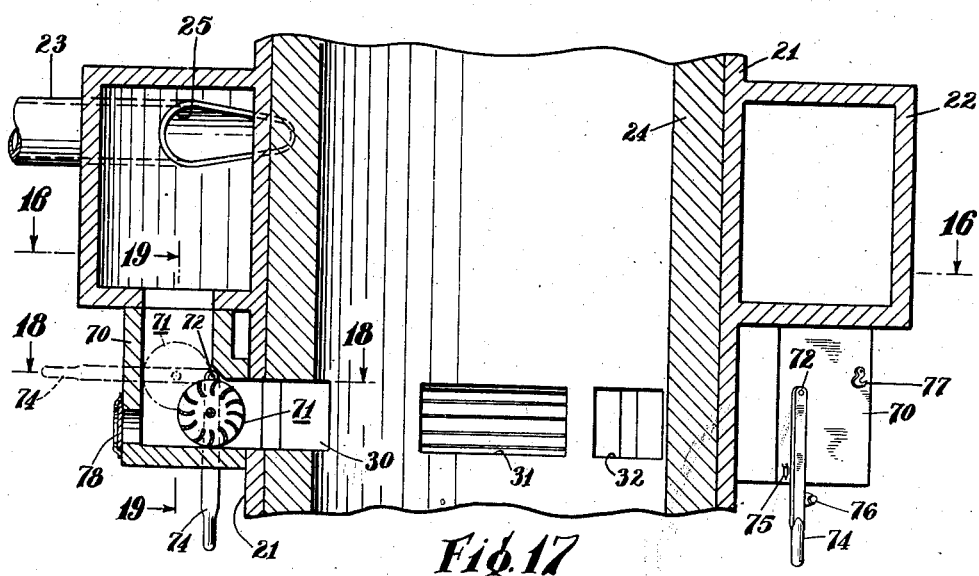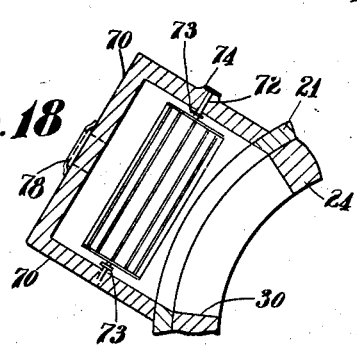

Patented Mar. 16, 1943

2,313,769

UNITED STATES PATENT OFFICE 2,313,769

APPARATUS AND METHOD FOR THE CONTROL OF AIR FLOW THROUGH FURNACE TUYÈRES

Herbert A. Reece, Cleveland Heights, Ohio

Application December 17, 1941, Serial No. 423,334

20 Claims. (Cl. 266—30)

My invention relates to supply apparatus for delivery of air and the like to furnaces such as metallurgical furnaces and the like and to operation of the same.

My present invention, herein described, is related in subject matter to my invention described in my United States Letters Patent No. 2,197,947 issued April 23, 1940, and is directed to the same and similar problems of furnace operation and control of air flow as is set forth in said patent and to other problems of furnace operation.

In the following discussion and description the operation and structure of a cupola for the remelting of metal will be referred to but it is to be understood that my invention includes the structure and operation of all furnaces or similar devices wherein a blast of air or other gases is supplied through a plurality of tuyères or like openings to the interior of the furnace or similar device.

It is an object of my invention to provide improved apparatus for supplying an air blast through a plurality of tuyères to the interior of a furnace.

Another object is the control of the air blast delivered to a furnace through a plurality of tuyères.

Another object is the modification of the current of air entering the plurality of tuyères of a furnace.

Another object is the provision for modifying the velocities of the air blast passing through the plurality of tuyères of a furnace.

Another object is the provision of apparatus and method of modifying a flow of air through tuyères of a furnace.

Another object is the provision for improving the control of an air blast to a furnace.

Another object is the provision of yieldable resistance to the flow of air through the tuyères of a furnace to control the velocity of the air through the tuyères.

Another object is the provision for modification of the velocity of an air blast through a tuyère by resistance to the air blast which yields to the force of the air blast.

Another object is the provision for adjusting the relative velocities of an air blast passing through a plurality of tuyères.

Another object is the provision of apparatus and method by means of which the velocities of air blast through a plurality of furnace tuyères may be equalized.

Another object is the provision for flexible control of the flow of air through a plurality of tuyères in order to meet varying conditions and requirements.

Another object is the provision for adjustment of the modification of the flow of air through a plurality of furnace tuyères.

Another object is the provision for supplying air through a plurality of tuyères at velocities and in amounts in accordance with conditions and requirements.

Another object is the provision for directing the flow of air through furnace tuyères as required.

Another object is the provision for modifying the direction of the flow of air into a furnace from a tuyère.

Another object is the provision for varying the character of the flow of air through a plurality of tuyères into a furnace.

Another object is the provision of yieldable resistors at each of a plurality of tuyères and adjustable means for positioning the resistors in the tuyères as required.

Another object is the provision for controlling and directing the flow of air through the tuyères of a furnace to feed the air to the interior of the furnace as desired.

Another object is the provision of yieldable resistors and adjustable means for changing the position of the resistors relative to the tuyères to provide access to the tuyères.

Another object is the provision of apparatus for the carrying out of the foregoing objects.

Another object is the provision of a method for the attainment of the stated desired result.

Other objects and a fuller understanding of my invention may be had by referring to the following description and claims, taken in conjunction with the accompanying drawings, in which:

Figure 1 is a cross-sectional view through half of a cupola and wind box incorporating my invention and is an enlargement of a view through the line 1—1 of Figure 2;

Figure 2 is a cross-sectional view taken lengthwise of a cupola and wind box incorporating my invention;

Figure 3 is a fragmentary detail view of my apparatus through the line 3—3 of Figure 1;

Figure 4 is a fragmentary detail view of one of my vane members at a tuyère and illustrates the mounting of the vane member to the cupola;

Figure 5 illustrates a modified form of vane member with the vane plates tilted in one direction;

Figure 6 illustrates the vane member of Figure 5 with the vane plates tilted in another direction;

Figure 7 illustrates another modified form of vane member;

Figure 8 is a view of an end plate of the vane member shown in Figures 5 and 6, looking in the direction of the arrows 8—8 of Figure 5;

Figure 9 is a cross-sectional view through half of a cupola and wind box somewhat similar to the view of Figure 1 and illustrates another arrangement of parts incorporating my invention, wherein the vane members may be adjustably moved forward and backward through the tuyères;

Figure 10 is a fragmentary enlarged view of my apparatus taken through the line 10—10 of Figure 9;

Figure 11 is a fragmentary detail view of one of the vane members of the modified arrangement of Figures 9 and 10 and illustrates the mounting of the vane member to the cupola at a tuyère;

Figure 12 is an enlarged fragmentary and sectional view illustrating the adjustable mounting of a vane member in the modified arrangement of Figures 9 and 10;

Figure 13 illustrates a modification in the form of vane member which may be utilized in the practice of my invention;

Figure 14 illustrates another modification in the form of vane member which may be utilized in the practice of my invention;

Figure 15 illustrates still another modification in the form of vane member which may be utilized in the practice of my invention;

Figure 16 is a cross-sectional view through half of a cupola and wind box somewhat similar to the views of Figures 1 and 9 and illustrates another arrangement of parts incorporating my invention, wherein the vane members may be moved up and down relative to the tuyères and in different positions in the respective bootleg pipes connecting each tuyère with the wind box;—the view of Figure 16 being taken through the line 16—16 of Figure 17;

Figure 17 is a sectional view taken lengthwise of the cupola and wind box of Figure 16 and through the line 17—17 of Figure 16;

Figure 18 is a sectional and fragmentary view taken through the line 18—18 of Figure 17; and Figure 19 is a sectional and fragmentary view taken through the line 19—19 of Figure 17.

Inasmuch as the invention disclosed herein is directed to the wind box and the portion of the cupola adjacent thereto it has not been considered necessary to show all parts of the cupola and therefore the drawings do not include the top portion and the bottom portion of the cupola, which portions may be considered as having the usual form. Also, for purposes of simplicity in illustration, the usual tap hole and slag hole are not shown. It has also been considered unnecessary to illustrate such other openings as a cleanout door, breast arch, or drop-bottom doors. The cupola with which the invention is associated and which is described herein may be considered, however, as having all of the parts necessary for the usual operation of the same.

As shown in the several views of the drawings the cupola body or shell 21 is in the form of a cylindrical shaft, the inner walls of the cupola body 21 being lined by the fire brick lining 24. The body 21 and the lining 24 are mounted upon the usual bottom plate and thereby forming the enclosed shaft of the cupola.

A wind box 22 of cylindrical shape is mounted upon the cupola body 21 by welding or other suitable means and in the embodiment shown, the outer wall of the cupola body forms one of the enclosing walls of the wind box 22. It is therefore seen from the views of the drawings that the wind box 22 forms an enclosed jacket surrounding the cupola body 21 in such a way that air introduced into the wind box may circulate entirely around the cupola body.

The inlet conduit 23 is in communication with the air blower or other source of an air blast (not shown) and the inlet conduit 23 is connected to the wind box 22 at the upper portion of the wind box 22 so as to afford communication between the air blower and the inlet opening 25 of the wind box 22.

In the cupola illustrated there are six tuyères extending through the wall and lining of the cupola body 21 to establish communication between the interior of the shaft of the cupola and the wind box 22. Tuyères 30, 31 and 32 as seen from the inside of the shaft of the cupola are illustrated in Figures 1, 2, 9, 16 and 17, and the other three tuyères of the other half of the furnace are similar. These six tuyères are of substantially equal size and are uniformly spaced around the periphery of the cupola. It is to be noted that the tuyères enter the cupola body at a low level in the cupola and communicate with the wind box in a lower portion thereof.

The description of the first form of my invention for controlling the flow of air blast through the plurality of tuyères of a furnace is made in conjunction with the showing of Figures 1 to 8, inclusive. With reference to said figures there is shown positioned at the entrance of each of the tuyères, from the side of the wind box, a plurality of vane members denoted generally by the reference character 26. Each vane member 26 is in the form of a paddle-wheel or fan composed of a plurality of blades 40 disposed radially of a common axis. The opposite ends of the blades 40 are welded or otherwise secured to disk end plates 39 to form the assembled vane member 26. A shaft 29 extends through, and is welded or otherwise rigidly secured to, the disk end plates 39 in such manner that the vane members 26 revolve with the respective shafts 29. The individual vane plates 40 do not extend inwardly to meet at the shaft 29 but are spaced radially therefrom to permit some leakage of air through the axial center of the vane member without being blocked or resisted.

A vane member 26 (six of them in number) is positioned at each of the six tuyères of the furnace so as to dominate and control the flow of air through the respective tuyère. Bearing supports 27 and 28 for mounting the vane members 26 in position are secured by bolts 41 or by other suitable means to the cupola shell 21 adjacent the sides of the tuyères. The extending ends of each shaft 29 are supported by the bearing supports 27 and 28 in such manner that the shaft 29 (of each vane member 26) is rotatable relative to the respective bearing supports 27 and 28. The axes of the vane members, that is, the shafts 29, are disposed horizontally in the furnace and are positioned about mid-way between the top and bottom walls of the respective tuyères.

The bearing supports 27 and 28 both have openings which accommodate the shaft 29 and permit the shaft to rotate therein. The bearing support 28 differs from the bearing support 27 in that it has another opening extending through a side thereof. An adjusting rod 36 having a threaded end 37 extends across the wind box from each bearing support 28 and through a hermetically sealed opening in the wall of the wind box. The bearing support 28 is internally threaded to threadably receive the threaded end 37 of the rod 36. The inner end face of the rod 36 is adapted to engage the annular surface of the shaft 29 and to frictionally retard the rotation of the shaft. The engagement of the inner end face of the rod 36 against the arcuate surface of the shaft 29 is such that the rod 36 yields to the force which may turn the shaft 29. The frictional engagement of the rod 36 on the shaft 29 therefore forms resisting and yielding means permitting the vane members to revolve and at the same time governing the revolving of the vane members.

At the outer end of each of the six adjusting rods 36 a crank handle 38 is secured. By turning the crank handles 38 the respective rods 36 are rotated and moved toward and away from the shafts 29. Each rod 36 may be adjustably turned to apply the desired amount of pressure against, and frictional engagement with, one of the shafts 29. In this manner the desired degree of retardation of the revolving of each vane member 26 may be nicely obtained. The rate of revolving of each of the six vane members 26 under the force of the air blast may be independently adjusted by adjustably retarding the revolving of each vane member through varying the frictional engagement of the respective rods 36 and shafts 29.

In air supply apparatus for cupolas and the like having no means in the wind box for equalizing the flow of air before reaching the plurality of tuyères, the air may flow through different tuyères at unequal rates. In the absence of means in the wind box for obtaining equalized velocities in the plurality of tuyères, as shown for example in my previously issued patents, the air currents in the wind box 22 supplied from the blast main 23 may be of such a character that the air flowing through one tuyère may travel at an excessive rate while at the same time the air flowing through another tuyère may travel at an insufficient rate. The inequality in the velocity of air flowing through the several tuyères is a disadvantage in the efficient operation of the furnace and adversely affects the melting operation therein.

The vane members 26 being in the path of the flow of air through each of the tuyères resists the flow. As the vane members may rotate under the force of the air blast they yield thereto and permit the air to continue to flow. The vane members may therefore be termed yieldable resistors. The degree of yieldance of the vane members to the force of the air blast affects the rate of flow of air passed by the vane members. The yieldance is adjusted by turning the handles 38 to vary the retardation of revolving of the vane members 26. In tuyères wherein the flow of air blast tends to become excessive the flow may be slowed down by adjusting the vane member or resistor at that tuyère to retard the revolving thereof. By thus adjusting each of the plurality of vane members or resistors a proper balance is obtained among the several tuyères and the flow of air through the tuyères into the furnace is equalized. The plurality of yieldable resistors at the tuyères thus provide means for equalizing the velocity of the air blast through the plurality of tuyères. The system is flexible and easily adaptable to the requirements of the furnace operation.

In Figures 5, 6 and 8 there is illustrated a slightly modified form of vane member that may be utilized in my apparatus. In this modified form of vane member, individual vane plates 46 are assembled around the shaft 29 by means of disk end plates 43. The opposite end plates 43 have radially disposed slots 47 into which the ends of the plates 46 extend. Collars 44 welded or otherwise secured to the respective end plates 43 receive the shaft 29. A set-screw 45 threadably engaged in the collar 44 engages the side of the shaft 29 and thus holds the assembled plates 46 and end plates 43 in fixed rigid position to revolve with the shaft 29. By adjusting the position of the collars 44 on the shaft 29 the plates 46 may be secured in one tilted position or another or secured in straight position. Figure 5 shows the assembly with the blades tilted in one direction and Figure 6 shows the assembly with the blades tilted in another direction. Figure 8 shows one of the end plates 43 and the radial slots 47 for receiving the ends of the plates 46.

It is sometimes desirable to shift the flow of air through the tuyère from one side to the other. The air blast is sometimes of a swirling or deflected nature and unless corrected passes through the tuyère into the furnace in an unsatisfactory manner. At other times it is desired to purposely pass the air blast toward one side or another as it goes through the tuyères. The form of vane member shown in Figures 5 and 6 provides a convenient and flexible means of modifying the nature of the flow of air through a tuyère.

Figure 7 shows a vane member somewhat similar to that shown in Figures 5 and 6. In Figure 7, individual vane plates 49 and individual vane plates 50 extend about half the length of the assembled vane member and have their adjacent ends carried by a middle slotted plate 48, the other ends being carried by the slotted end plates 43. By shifting the position of the plates 50 and securing them in the shifted position to the shaft 29, a vane member of desired structure may be obtained. By way of example, Figure 7 illustrates one position in which such a vane member may be secured. The direction of the air blast through a tuyère may be modified by the vane member of Figure 7, as in the case of the vane member of Figures 5 and 6. Thus the vane members shown in Figures 5, 6 and 7 may be used to neutralize the tangential flow of air in the wind box to any degree desirable.

A modified arrangement of parts in my apparatus is illustrated in Figuers 9 to 12, inclusive. In this modified arrangement, the position of the revolvable vane members or resistors in the tuyères may be adjustably fixed as required. In the modified arrangement of Figures 9 to 12, the revolvable vane members are denoted generally by the reference characters 52. Each vane member 52 is made up of an assembly of vane plates 54 rigidly mounted upon a shaft 53 so as to revolve with the shaft. The vane plates 54 are somewhat arcuate to revolve more freely and positively under the force of the air blast, as is illustrated in the view of Figure 10.

To provide means for mounting the vane members 52 in the respective six tuyères, vertical steel plates 55 are positioned on the opposite vertical sides of each tuyère. Each plate 55 has a horizontally disposed slot 56 about mid-way between the top and bottom of the tuyère. The ends of the shaft 53 extend through the slots 56 in such a manner that the shaft 53 may move forward and backward in the tuyère in a horizontal direction.

The outer edge portion of each vertical plate 55 adjacent the wind box is bent at right angles to form the flanged portion 61, as shown in Figures 10 and 11. In each tuyère, having a pair of plates 55 therein, means are provided for moving the vane members 52 forward and backward. Along one side of each tuyère a slide rod 57 extends in a horizontal direction from the flanged portion 61 and between the plate 55 and the side wall of the tuyère and has its forward or inner end covered or protected by the fire-brick lining 24 of the cupola. The outer end of the rod 57 is welded to the flanged portion 61 or otherwise secured in fixed position. Along the opposite side of each tuyère a threaded rod 58 extends in a horizontal position through the flanged portion 61 and between the side wall of the tuyère and has its forward end covered or protected by the fire brick lining 24 of the cupola. The rod 58 extends through an opening in the flanged portion 61 and across the wind box and through the wall thereof, as shown in Figures 9 and 10. An abutting flange 68 on the rod 58 slidably engages the inner wall of the wind box 22 and an abutting flange 69 slidably engages the face of the flanged portion 61 of the plate 55. In this way the rod 58 is permitted to rotate on its own axis but is held against longitudinal movement. There is a hermetic seal between the rod 58 and the outer wall of the wind box, the seal permitting the rod 58 to turn upon the revolving of the crank handle on the outer end of the rod outside of the wind box.

The shaft 53 is connected to, and carried by, the slide rod 57 and the threaded rod 58, by means of sliding support member 59 and threaded support member 60, respectively. The slide support member 59 slides on the rod 57 and the threaded support member 60 moves back and forth on rod 58 upon the turning of rod 58. Figure 12 illustrates the mounting of member 60 on rod 58. The mounting of member 59 on rod 57 is similar except that there is a sliding engagement between them rather than a threaded engagement.

The ends of the shaft 53 are rotatably carried by the support members 59 and 60, as illustrated in Figure 12. The shaft 53 and the vane member 52 are revolvable relative to the support members 59 and 60. To provide yieldable means for adjustably retarding the revolving of the vane member, a threaded adjusting bolt 62 extending through the support member 62 resiliently presses a ball bearing 64 by means of a coil spring 63 against the side of the shaft 53. The frictional engagement of the ball 64 and shaft 53 may be finely adjusted by turning the bolt 62. As shown in Figure 11, the bolt 62 may be reached by a suitable wrench through an opening in the flanged portion 61.

The mechanism described for moving a vane member 52 backward and forward is the same for each vane member at the respective tuyères. It is seen that by turning the crank handles on the rods 58 the respective vane members 52 may be moved backward and forward in the tuyères. The vane members 52 revolve under the force of the air blast through the tuyères and are retarded in their revolutions by the adjustable retarding means described. The vane members resist the flow of air through the tuyère and upon revolving yield to the force of the flow of air. The frictional retarding means yields to the force revolving the vane members and provide adjustable yielding means controlling the revolving of the vane members. By governing the revolving of the vane members the flow of air through the tuyères is controlled and modified. Excessive flow of air at a tuyère may be corrected by adjustably applying greater resistance to the revolving of the vane member at that tuyère to hold back the flow of air.

The directional flow of air through the tuyères may be modified by substituting vane members such as shown in Figures 5, 6 and 7 in the apparatus of Figures 9 to 11. The flow of air is directed into the interior of the furnace in a manner to meet particular operating conditions and requirements.

Greater flexibility to the control of air through the tuyères is obtained by adjusting the position of the vane members in the respective tuyères. Also, the control of the direction of the blast of air from the tuyère into the interior of the furnace may be obtained to a considerable extent by changing the position of the vane member in the tuyère. The flow of air may be diffused, concentrated or otherwise modified by moving the vane member to different positions in the tuyère relative to the interior of the cupola.

In the apparatus illustrated in Figures 9, 10 and 11 the vane member 52 has arcuate shaped vane plates 54 as shown in Figure 10. Modified forms of vane members shown in Figures 13, 14 and 15 may be used in the place of the vane member 52. In Figure 13, the vane member has arcuate shaped blades 65 which extend into the shaft 53 to form a closed center, the blades 65 curving in one direction. Figure 14 shows a vane member similar to that shown in Figure 13 except that the arcuate blades 66 are curved in the opposite direction. By a proper choice of the type of vane member to be used the air may be "thrown" into the shaft of the cupola at a desired angle or from a desired direction, one vane member tending to pass the air in an upward direction and another vane member tending to pass the air in a downward direction. Figure 15 shows a vane member somewhat similar to the preferred type shown in Figures 9, 10 and 11 but in which the vane blades 67 are angularly disposed as illustrated.

Figures 16 to 19, inclusive, illustrate another arrangement of parts which may be utilized for carrying out my invention. In this arrangement bootleg pipes 70 are provided between the wind box 22 and the six tuyères rather than the wind box communicating directly with the tuyères. As there are six tuyères in the illustratory cupola shown there are six bootleg pipes 70, each communicating with a respective tuyère. A vane member, denoted generally by the reference character 71, is pivotally mounted in each bootleg pipe 71 by means of a hinge or pivot pins 72 at the elbow of the pipe. As shown in Figure 19, the pivot pins extend into the wall of the bootleg pipe 70. Inside the pipe 70 short crank arms 73 carry the shaft of the revolvable vane member 71. One of the pivot pins 72 extends through a hermetic seal in the wall of the pipe 70 and a long arm or lever 74 is rigidly secured to the end of the extended pivot pin 72.

By raising the lever 74 to a horizontal position the vane member 72 is swung up within the pipe 70 upon the pivot pins 72. The upper position of a vane member within a bootleg pipe is shown in broken lines in Figure 17. By lowering the lever 74 to a vertical position the vane member 71 is swung down in the pipe 70 upon the pivot pins 72. The lower position of a vane member within a bootleg pipe is shown in full lines in Figure 17. A stop or check 75 on the outside of the pipe 70 limits the inward movement of the lever 74 and prevents the vane member 71 from being jammed into the entrance to the tuyère. Reference characters 76 and 77 denote a lock arrangement for holding the lever 74, and vane member 71, in raised position as desired.

Peep holes protected by mica peep hole covers 78 are positioned in each bootleg pipe 70 in such manner as to permit the cupola operator to look through the peep holes, through the tuyères and into the interior of the cupola. To remove the vane members 71 from his line of vision, the operator raises the lever 74 which raises the vane member to its upper position. The bootleg pipes 70 are rectangular in cross-section to accommodate the vane member 71 and its up and down movement in the pipe. In either raised or lowered position, the vane member 71 yieldably resists the flow of air through the bootleg pipe and through the tuyère. By yielding the flow of air the vane member or resistor modifies and controls the flow of air through the tuyère into the shaft of the cupola. By modifying the flow of air into each tuyère the air blast through the plurality of tuyères may be controlled, as has been previously described.

The bootleg pipes 70 are, in effect, extensions or continuations, of the respective tuyères. The bootleg pipe may therefore be considered as a part of the tuyère or separate feeding conduit providing air from the wind box to the interior of the cupola. In this view, the raising and lowering of the vane member 71 in the bootleg pipe 70 is similar to moving the vane member forward and backward in the tuyère in the manner described in connection with Figures 9 to 12, inclusive. Similarly, desirable results may be obtained by changing the position of the vane members 71 from one position to another to meet requirements and conditions of operation.

It is to be understood that any of the several different forms of vane members disclosed may, be substituted for the other vane members shown mounted in position in different arrangements of my apparatus, as may be desired or required.

By the method and apparatus here described, desired results in furnace operation are obtainable, and varying conditions and requirements may be flexibly met and answered.

Although I have described my invention with a certain degree of particularity, it is understood that the present disclosure has been made only by way of example and that numerous changes in the details of construction and the combination and arrangement of parts may be resorted to without departing from the spirit and the scope of the invention as hereinafter claimed.

I claim as my invention:

1. In a furnace having a wind box for supplying a blast of air to a plurality of tuyères, said wind box having an inlet adapted to communicate with a source of air blast and having outlets in communication with said tuyères, a plurality of yieldable resistors positioned at each of said outlets, respectively, to control the flow of air therethrough, each of said resistors yieldably resisting the air blast through a respective outlet to modify the relative velocity of the flow of air out of the outlets through the plurality of tuyères into the furnace.

2. In a furnace having a wind box for supplying a blast of air to a plurality of tuyères, said wind box having an inlet adapted to communicate with a source of an air blast and having outlets in communication with said tuyères, a plurality of movable resisting members positioned at each of said outlets, respectively, to control the flow of air therethrough, and retarding means connected to said resisting members for retarding the movement of said resisting members, whereby the resisting members resist the air blast through each said outlet and permit said air blast to flow out of the outlets through said tuyères into the furnace at modified velocities.

3. In a furnace having a wind box for supplying air to a plurality of tuyères, said wind box having an inlet adapted to communicate with a source of an air blast and having outlets in communication with said tuyères, a plurality of movable resisting members disposed at said outlets, respectively, in the path of the flow of air into the respective tuyères, yielding means connected to said resisting members for yieldably urging said resisting members to resist the flow of air into each of the tuyères and to permit the flow of air through the tuyères at modified velocities, and adjustable means for adjustably fixing the yieldability of said yielding means to adjust the modification of said air flow.

4. In a furnace having a wind box for supplying a blast of air to a plurality of tuyères, said wind box having an inlet adapted to communicate with a source of an air blast and having outlets in communication with said tuyères, a plurality of movable resisting members positioned, respectively, to substantially block the flow of air out of each of said outlets through the tuyères, yielding means for urging said resisting members to resist the said blast and to yield to the force thereof to allow the blast to flow through the tuyères, and adjustable means for adjusting the movability of said resisting members relative to each other in yieldance to said blast, the relative velocities of the air blast through the plurality of tuyères into the furnace being modified by the yieldable resistance of said plurality of resisting members moved by the air blast.

5. In a furnace having a plurality of tuyères supplied with an air blast from a common source, a plurality of revolvable vanes mounted at said plurality of tuyères, respectively, to encounter the flow of air therethrough, said vanes being revolvable by said air blast at each said tuyère to yield thereto, and means for adjustably retarding the revolving of said vanes, the said vanes modifying the velocities of the air blast flowing through the plurality of tuyères into the furnace.

6. In a furnace having a plurality of tuyères supplied with an air blast from a common source, a movable vane member positioned at each tuyère in the path of the flow of air therethrough, said vane members being movable by the air blast to permit the air to flow through the tuyères, and means for adjustably retarding the movement of said vane members relative to each other, the retarded movement of the vane members by the air blast modifying the relative velocities of the air blast through the tuyères.

7. In a furnace having a wind box for supplying an air blast to a plurality of tuyères entering the furnace, a squirrel-cage vane member revolvably mounted at each of the tuyères in the path of the flow of air therethrough to be revolved thereby and to modify the rate of flow through the respective tuyère.

8. In a furnace having a common source of an air blast for supplying a plurality of tuyères entering the furnace, a squirrel-cage vane member positioned at each said tuyère, mounting means for said vane members to permit the same to revolve by the force of the air blast through each said tuyère, retarding means for retarding the revolving of said vane members, and adjustable means for adjustably fixing the degree of retardation by said retarding means, the air blast being supplied to the furnace through the plurality of tuyères at modified velocities.

9. In a furnace having a common source of an air blast for supplying a plurality of tuyères entering the furnace, a yieldable resistor positioned in each of said tuyères to yieldably resist and to modify the flow of air therethrough, means for separately adjusting the yieldance of the resistors to the force of air blast through the respective tuyères, and means for adjustably moving the position of each resistor in its respective tuyère to vary the modification of the flow of air therethrough.

10. In a furnace having a wind box for supplying an air blast to a plurality of tuyères entering the furnace, a revolvable vane member positioned in each of said tuyères to modify the flow of air therethrough, mounting means for each said vane member to permit the same to revolve, adjustable means carried by the mounting means for adjustably retarding the revolving of the vane members under the force of the air blast, and means connected to said mounting means for changing the position of each said vane member in its respective tuyère.

11. In a furnace having a wind box for supplying an air blast through a plurality of tuyères entering the furnace, a yieldable resistor mounted in each of said tuyères to modify the flow of air therethrough, means for adjusting the yieldance of each said resistor to the force of the air blast through the tuyère, and means for adjusting the position of each said resistor in its respective tuyère relative to the interior of the furnace.

12. In a plurality of cupola tuyères supplied with an air blast by a wind box, revolvable vane members positioned in each tuyère for modifying the flow of the air blast therethrough, and means for separately adjusting the revolvability of each of the vane members by the force of the air blast, whereby the air blast entering the furnace through the plurality of tuyères may be adjustably modified.

13. In a furnace having a plurality of bootleg pipes respectively providing communication between a wind box and a plurality of tuyères entering the furnace, each of the bootleg pipes having a bend intermediate its ends and having a peep-hole at the bend in line with a respective tuyère, the combination of a revolvable vane member positioned in each said bootleg pipe for modifying the flow of air therethrough, bearing means for carrying each said vane member, and lever means operable from outside of the bootleg pipe and connected to each said bearing means for moving each vane member around the bend in the bootleg pipe out of the line between the peep-hole and tuyère to permit a view therealong.

14. In a system for controlling the flow of air supplied to a furnace from a wind box through a plurality of tuyères, the combination of a yieldable resistor in each of the tuyères for yieldably resisting the flow of air therethrough to modify the velocity of the flow and adjusting means for each said resistor to adjust the yieldability thereof, whereby the velocity of the flow of air through the plurality of tuyères may be equalized.

15. In the operation of the metallurgical furnace, the method of controlling the flow of air blast through the plurality of tuyères entering the furnace by yieldably resisting in each tuyère the flow of air therethrough and by adjusting the yieldable resistance in said tuyères to balance the flow of air through said tuyères whereby a uniform flow of air through the plurality of tuyères is obtained.

16. In the operation of a metallurgical furnace, the method of supplying air thereto through a plurality of tuyères comprising: yieldably resisting within each tuyère the flow of air therethrough, retarding the flow of air by said yieldable resistance, and balancing said retarding to equalize the velocity of the flow of air through the plurality of tuyères.

17. In a system for supplying blown air into a furnace through a plurality of tuyères from a wind box, the combination of first means at each tuyère for modifying the velocity of the flow of air through the respective tuyères and second means for adjusting each of said first means to balance the modification of the flow of air through the plurality of tuyères, whereby the air is supplied to the furnace through the tuyères at equalized velocities.

18. In a furnace having a wind box for supplying an air blast to a plurality of tuyères entering the furnace, a plurality of movable resisting members positioned at each of said tuyères, respectively, in the path of the flow of air through said each tuyère, and means for determinably adjusting the disposition and movability of the respective resisting members at each tuyère to control the flow of air through said each tuyère.

19. In a furnace having a wind box for supplying an air blast to a plurality of tuyères, said wind box having an inlet adapted to communicate with a source of an air blast and having outlets in communication with said tuyères, a plurality of revolvable vane members positioned at each of said outlets, respectively, to control the flow of air therethrough, said vane members being yieldably retarded to yieldably resist the said flow of air, said vane members having a plurality of vanes extending from an axis, and means for adjustably fixing the disposition of said vanes relative to the said axis whereby the direction of the flow of air into the furnace through said tuyères is controlled.

20. In the operation of a metallurgical furnace, the method of controlling the flow of air blast through the plurality of tuyères entering the furnace by yieldably resisting the flow of air through the tuyères and by adjusting the yieldable resistance in said tuyères whereby a controlled flow of air through the plurality of tuyères is obtained.

HERBERT A. REECE.